United States Patent
Koo

(10) Patent No.: US 7,840,232 B2
(45) Date of Patent: Nov. 23, 2010

(54) METHOD OF CONTROLLING TRANSMIT POWER IN WIRELESS COMMUNICATION SYSTEM

(75) Inventor: Hyounhee Koo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 432 days.

(21) Appl. No.: 12/050,825

(22) Filed: Mar. 18, 2008

(65) Prior Publication Data

US 2008/0233993 A1    Sep. 25, 2008

(30) Foreign Application Priority Data

Mar. 20, 2007    (KR) .................. 10-2007-0027159

(51) Int. Cl.
H04M 1/00 (2006.01)
H04B 7/00 (2006.01)
H04B 17/00 (2006.01)
H04B 7/185 (2006.01)
H04B 1/00 (2006.01)
H04W 72/00 (2009.01)

(52) U.S. Cl. ............... 455/522; 455/450; 455/512; 455/517; 455/68; 455/69; 455/67.11; 370/318

(58) Field of Classification Search .......... 455/522, 455/450, 512, 517, 68–69, 67.11; 370/318
See application file for complete search history.

(56) References Cited

U.S. PATENT DOCUMENTS

| | | | |
|---|---|---|---|
| 6,952,591 B2 * | 10/2005 | Budka et al. ............... 455/517 |
| 7,373,168 B1 * | 5/2008 | Kumar ........................ 455/522 |
| 7,496,058 B2 * | 2/2009 | Kim et al. ................ 370/310.1 |
| 2002/0021682 A1 * | 2/2002 | Ariyoshi et al. ............. 370/335 |
| 2002/0155853 A1 * | 10/2002 | Lee et al. ..................... 455/522 |
| 2003/0207695 A1 * | 11/2003 | Chang et al. ................ 455/522 |
| 2004/0157636 A1 * | 8/2004 | Koo et al. .................... 455/522 |
| 2007/0243895 A1 | 10/2007 | Koo |

FOREIGN PATENT DOCUMENTS

EP    0949768    10/1999
WO    2008/020719    2/2008

\* cited by examiner

*Primary Examiner*—Yuwen Pan
*Assistant Examiner*—Bobbak Safaipour
(74) *Attorney, Agent, or Firm*—Lee, Hong, Degerman, Kang & Waimey

(57) ABSTRACT

A method of controlling a transmit power includes determining a power control parameter of an assigned timeslot, wherein the value of the power control parameter is a default value if the assigned timeslot is assigned with no power control parameter and the value of the power control parameter is the current value if the assigned timeslot is already used by the mobile station and determining the transmit power on an uplink channel.

19 Claims, 9 Drawing Sheets

METHOD OF CONTROLLING TRANSMIT POWER IN WIRELESS COMMUNICATION SYSTEM

CROSS-REFERENCE TO RELATED APPLICATIONS

This application claims the benefit of priority of a Korean Patent Application Serial No. 10-2007-0027159, filed on Mar. 20, 2007, which is incorporated by reference in its entirety herein.

BACKGROUND

1. Technical Field

The present invention relates to wireless communication and, in particular, to a method of determining a transmit power on an uplink channel in a wireless communication system such as a general packet radio service (GPRS) system.

2. Related Art

The GSM (Global System for Mobile communication) is a radio technology which has been developed as a system for standardizing radio communication systems in Europe and which has widely been deployed all over the world. The GPRS (General Packet Radio Service) is introduced to provide a packet switched data service in a circuit switched data service provided from the GSM. The EDGE (Enhanced Data Rate for GSM Evolution) employs the 8-PSK (Phase Shift Keying) instead of the GMSK (Gaussian Minimum Shift Keying) employed in the GSM. The EGPRS (Enhanced General Packet Radio Service) represents the GPRS using the EDGE.

The physical channel dedicated to GPRS/EGPRS traffic is called Packet Data Channel (PDCH). Logical channels such as Packet Common Control Channel (PCCCH), Packet Data Traffic Channel (PDTCH) and Packet Associated Control Channel (PACCH) are mapped to the PDCH. The PCCCH is used for control signaling necessary for initiating packet transfer. The PDTCH is used to transmit user data. The PACCH is used for dedicated signaling.

Time division multiplex access (TDMA) scheme is applied in GSM/GPRS/EDGE systems. In TDMA scheme, each mobile station in a cell transmits and receives circuit switched data and/or packet switched data through assigned timeslots. One to eight timeslots can be allocated to a mobile station per TDMA frame. Timeslots are shared by the active users, and uplink and downlink timeslots are allocated separately. Hereinafter, downlink means communication from a network to a mobile station, and uplink means communication from a mobile station to a network. In GPRS/EDGE system, users can share a single timeslot simultaneously with several users in a cell. A single user may transmit and receive data over multiple timeslots simultaneously.

The power control is necessary to mitigate co-channel interference in a wireless communication system. Keeping co-channel interference levels low can result in higher throughput over a cell, potentially increasing cell's capacity. Effective power control ensures that timeslots used for GSM/GPRS/EDGE system do not cause unacceptable levels of interference to timeslots used for voice calls in co-channel neighbor cells.

Inadequate power control can cause high error rates or, at worst, broken radio connections which in known as temporary block flows (TBFs). Power control errors may increase packet delays and decrease user throughputs, thus causing service degradation.

Uplink power control mechanisms allow a network to tune uplink transmit power used by each mobile station transmitting uplink data blocks. Uplink power control provides an additional important benefit: transmit power used by each mobile station can be reduced to levels adequate to achieve proper link performance and transmit power can be kept as low as possible without sacrificing link throughput, giving users peak link performance without unnecessarily draining the mobile station's battery.

SUMMARY

The present invention provides a method of controlling a transmit power when a new timeslot is allocated or a used timeslot is updated.

In an aspect, a method of controlling a transmit power at a mobile station in a wireless communication system is provided. The method includes determining a power control parameter of an assigned timeslot, wherein the value of the power control parameter is a default value if the assigned timeslot is assigned with no power control parameter and the value of the power control parameter is the current value if the assigned timeslot is already used by the mobile station and determining the transmit power $P_{up}$ on an uplink channel from the following equation:

$$P_{UP} = \min\{C_0 - C_{CH} - r(L+48), P_{MAX}\}$$

where $C_0$ is a power offset, $C_{CH}$ is the power control parameter, r is a system parameter, L is a normalized received signal level at the mobile station and $P_{MAX}$ is the maximum allowed transmit power in a cell.

In another aspect, a method of controlling a transmit power at a mobile station during handover in a wireless communication system is provided. The method includes receiving a handover command message from a network to command the mobile station to leave a current cell and change to a new cell, the handover command message comprising radio resources assigned for packet-switched (PS) services in the new cell, the radio resources comprising information on at least one assigned timeslot, determining a power control parameter of an assigned timeslot as a default value if the assigned timeslot is assigned with no power control parameter and determining the transmit power $P_{up}$ on an uplink channel from the following equation:

$$P_{UP} = \min\{C_0 - C_{CH} - r(L+48), P_{MAX}\}$$

where $C_0$ is a power offset, $C_{CH}$ is the power control parameter, r is a system parameter, L is a normalized received signal level at the mobile station and $P_{MAX}$ is the maximum allowed transmit power in a cell.

In still another aspect, a mobile station includes a RF (Radio Frequency) unit for transmitting radio signals using a transmit power, a memory configured to store a default value for a power control parameter and a processor coupled to the RF unit and the memory, and configured to determine a power control parameter of an assigned timeslot, wherein the value of the power control parameter is the default value if the assigned timeslot is assigned with no power control parameter and the value of the power control parameter is the current value if the assigned timeslot is already used by the mobile station and determine the transmit power $P_{up}$ from the following equation:

$$P_{UP} = \min\{C_0 - C_{CH} - r(L+48), P_{MAX}\}$$

where $C_0$ is a power offset, $C_{CH}$ is the power control parameter, r is a system parameter, L is a normalized received signal level at the mobile station and $P_{MAX}$ is the maximum allowed transmit power in a cell.

When a mobile station is assigned a timeslot or updates power and/or timing advance for uplink transmission, the mobile station can stably control a transmit power of a timeslot.

DESCRIPTION OF THE EXEMPLARY EMBODIMENTS

Figure 1:
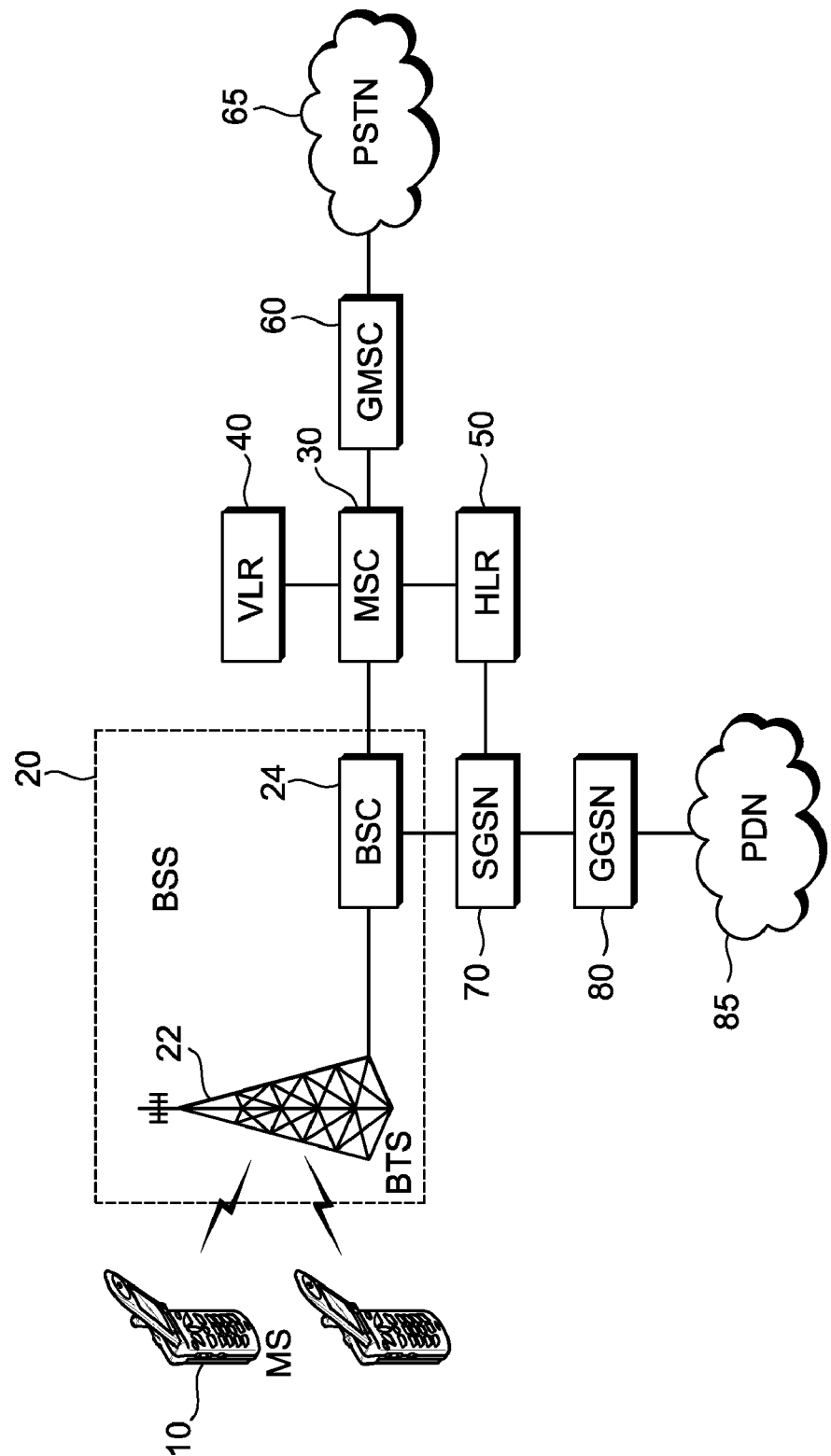
FIG. 1 is a block diagram illustrating a wireless communication system.

FIG. 1 is a block diagram illustrating a wireless communication system. This shows a network based on the GSM (Global System for Mobile communication)/GPRS (General Packet Radio Service). The wireless communication systems are widely used to provide a variety of communication services of voice, packet data, and so on.

Referring to FIG. 1, a mobile station (MS) 10 refers to a communication instrument carried by a user and may also be called other terms such as a UE (User Equipment), a UT (User Terminal), a SS (Subscriber Station), and a wireless device. A base station (BS) 20 includes a base transceiver station (BTS) 22 and a base station controller (BSC) 24. The BTS 22 communicates with the MS 10 in a cellular area through a radio interface and a synchronization function with the MS 10. The BSC 24 interfaces at least one BTS 22 with a mobile switching center (MSC) 30. The BS 20 may be called as a base station subsystem, a Node-B, and an access point.

The MSC 30 connects the BS 20 to a different kind of network such as the PSTN (Public Switching Telephone Network) 65 or the PLMN (Public Land Mobile Network) through the GMSC (Gateway MSC) 60. A VLR (Visitor Location Register) 40 stores temporary user data, which includes information on the roaming of all the MSs 10 in a service area of the MSC 30. An HLR (Home Location Register) 50 includes information on all the subscribers in the home networks. An SGSN (Serving GPRS Support Node) 70 takes charge of mobility management of the subscribers. A GGSN (Gateway GPRS Data Network) 80 routes a packet at the current position of the MS 10 to interface the MS with an external packet data network such as PDN (Public Data Network) 85.

A temporary block flow (TBF) is a logical connection offered by two Medium Access Control (MAC) entities so as to support the unidirectional transfer of Radio Link Control (RLC) Protocol Data Unit (PDU) on basic physical subchannels. The TBF is not provided in a packet idle mode. In the packet idle mode, any radio resource on a packet data physical channel is not assigned to the MS. At least one TBF is provided in a packet transfer mode. In the packet transfer mode, radio resources on one or more packet data physical channels for the transfer of packet data are assigned to the MS. The MAC-idle state means a MAC-control-entity state where no basic physical subchannel is assigned. A Temporary Flow Identity (TFI) is assigned to each TBF by the network. The MS assumes that the TFI value is unique among concurrent TBFs in the same direction (uplink or downlink) on all Packet Data Channels (PDCHs) used for the TBFs. The same TFI value may be used concurrently for TBFs on other PDCHs in the same direction and for TBFs in the opposite direction.

Figure 2:
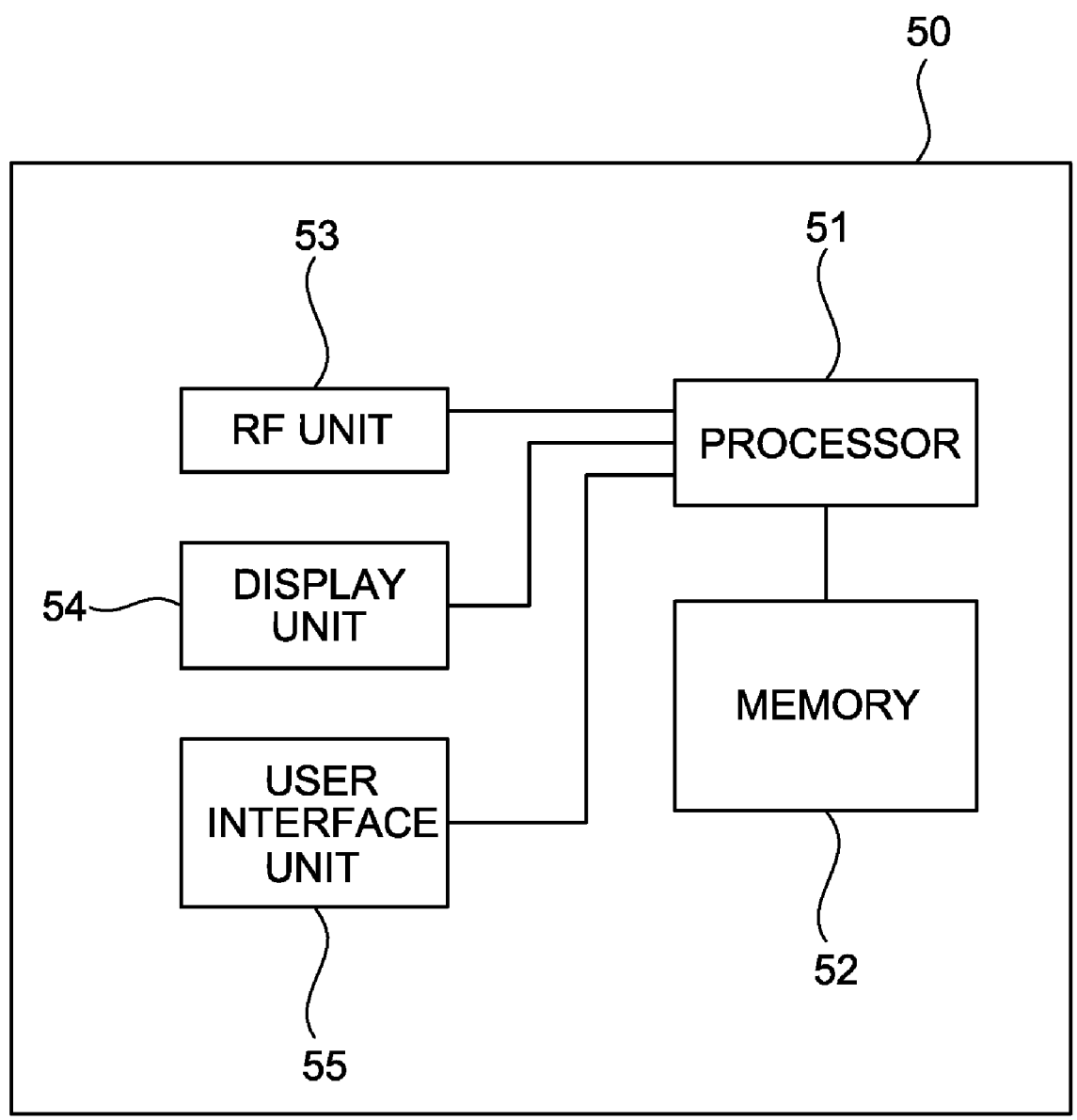
FIG. 2 is a block diagram showing elements of a mobile station.

FIG. 2 is a block diagram showing elements of a mobile station. A mobile station includes a processor 51, memory 52, a RF unit 53, a display unit 54, and a user interface unit 55. The memory 52 is coupled to the processor 51 and stores a MS operating system, applications and general files. The display unit 54 displays various pieces of information of the MS and may employ well-known devices such as a Liquid Crystal Display (LCD) or an Organic Light Emitting Diode (OLED). The user interface unit 55 may consist of a combination of well-known user interfaces such as a keypad and a touch screen. The RF unit 53 is coupled to the processor 51 and transmits radio signals.

The processor 51 implements functions of determining a transmit power. The memory stores a power control parameter and the processor 51 determines the transmit power using based on the power control parameter. The RF unit transmits radio signals using the determined transmit power.

Figure 3:
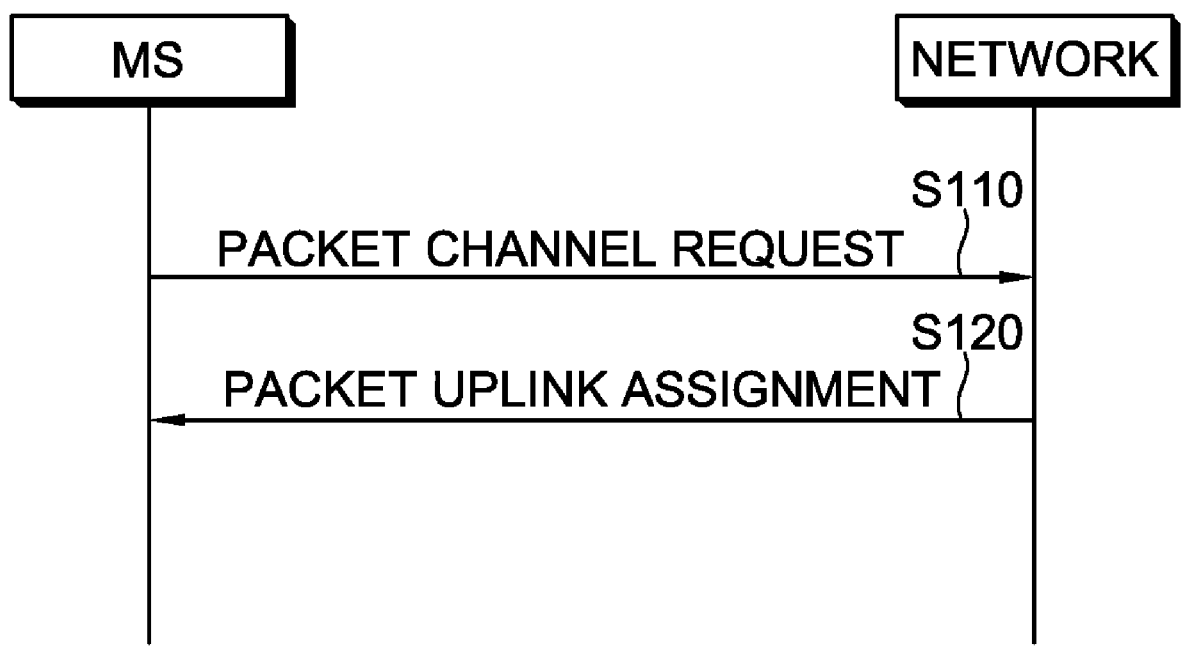
FIG. 3 is a flowchart illustrating a method of controlling a transmit power in accordance with an embodiment of the present invention.

FIG. 3 is a flowchart illustrating a method of controlling a transmit power in accordance with an embodiment of the present invention. This may be uplink access from a mobile station to a network or may also be called random access procedure.

Referring to FIG. 3, a mobile station sends a packet channel request message to the network for radio access (S110). The packet channel request message may be a message to request radio access. The mobile station requests allocation of radio resources to the network for uplink transmission. The packet channel request message can be transmitted on RACH (Random Access Channel) or PRACH (Packet Random Access Channel). If the EGPRS is supported, the packet channel request message may be an EGPRS channel request message. The mobile station can re-transmit the packet channel request message by a predetermined number when there is no response from the network after a predetermined time passes. If the mobile station does not receive any response, regarding the packet uplink assignment message, from the network, it results in random access failure.

The network sends a packet uplink assignment message to the mobile station in response to the packet channel request message (S120). The packet uplink assignment message is a response of the network with respect to the radio access request by the mobile station. The packet uplink assignment message can be transmitted on PCCCH (Packet Common Control Channel) or PACCH (Packet Associated Control Channel). The packet uplink assignment message can include information on radio resources, which are required by the mobile station for uplink transmission. In the GSM/GPRS system, the radio resources may be a timeslot. Alternatively, the radio resources may be a radio block. In the GPRS system, one frame is comprised of eight timeslots, and a radio block is comprised of four consecutive timeslots belonging to different frames.

The mobile station determines a transmit power of each assigned timeslot for uplink transmission in addition to information about timeslot assignment. In the mobile station, a transmit power $P_{up}$ on each uplink PDCH (Packet Data Channel) can be obtained from the following equation:

$$P_{UP} = \min\{C_0 - C_{CH} - r(L+48), P_{MAX}\} \quad \text{[Equation 1]}$$

where $C_0$ is a power offset, $C_{CH}$ is a power control parameter, r is a system parameter, L is a normalized received signal level at the mobile station and $P_{MAX}$ is the maximum allowed transmit power in a cell. The $C_{CH}$ is the channel specific power control parameter. The power offset $C_0$ is a constant and may be set to 39 dBm for GSM 900 and 36 dBm for DCS 1800 and PCS 1900. The system parameter r is broadcasted on a packet broadcast control channel (PBCCH) or optionally sent to a mobile station in an RLC control message.

If the power control parameter $C_{CH}$ is decided when the system parameter r and the power offset $C_0$ are known, the mobile station can calculate the transmit power $P_{up}$ with respect to the corresponding timeslot.

The packet uplink assignment message can include a power control parameter of a timeslot in addition to information about at least one timeslot, which is necessary by the mobile station for uplink transmission. In this case, a transmit power can be found by employing the power control parameter included in the packet uplink assignment message. The problem is that the power control parameter with respect to each timeslot cannot be defined when the power control parameter is not included in the packet uplink assignment message. A method of defining the power control parameter is needed in order to efficiently control a transmit power. A variety of methods can be used to define the power control parameter.

In an embodiment, if a timeslot is assigned through the packet uplink assignment message, a mobile station can set a power control parameter of the assigned timeslot to a default value. For example, the default value may be zero. By setting the power control parameter to the default value, when the packet uplink assignment message is received, the mobile station can calculate a transmit power with respect to the assigned timeslot and perform uplink transmission by employing the calculated transmit power.

In another embodiment, a mobile station can calculate a transmit power by employing a previous power control parameter. The previous power control parameter refers to a power control parameter that is already used in a packet transfer mode anterior to a current packet transfer mode. That is, in the case where the mode changes from a packet transfer mode to a packet idle mode and then becomes a current packet transfer mode again, a power control parameter that had been used in a previous packet transfer mode is a previous power control parameter. If a corresponding timeslot has a previous power control parameter, the mobile station calculates an output power based on the previous power control parameter. If the mobile station accesses the network for the first time after power is on or is assigned a timeslot for the first time, a previous power control parameter does not exist. If a previous power control parameter does not exist, the mobile station can calculate a transmit power by defining a power control parameter as a default value.

If a power control parameter is not included in the packet uplink assignment message, the mobile station can find a transmit power by using a previous power control parameter or a default value as the power control parameter. Hence, a user equipment can set a power control parameter automatically without the need to transmit the power control parameter to each user equipment whenever the network assigns a new timeslot. Thus, scheduling is simplified and the efficient power control in a cell is achieved.

Figure 4:
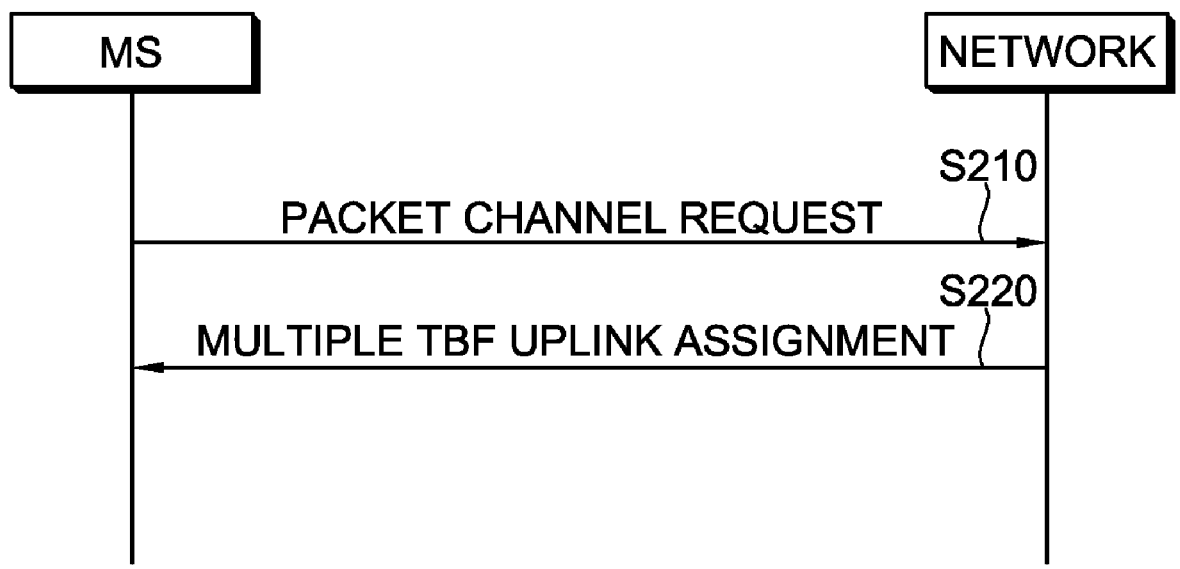
FIG. 4 is a flowchart illustrating a method of controlling a transmit power in accordance with another embodiment of the present invention.

FIG. 4 is a flowchart illustrating a method of controlling a transmit power in accordance with another embodiment of the present invention.

Referring to FIG. 4, a mobile station sends a packet channel request message to a network for radio access (S210). The network sends a multiple TBF uplink assignment message to the mobile station in response to the packet channel request message (S220). The multiple TBF uplink assignment message may be transmitted on PACCH. Unlike the packet uplink assignment message, the multiple TBF uplink assignment message assigns a multiple TBF to the mobile station. The multiple TBF uplink assignment message includes timeslot assignment information for uplink transmission in each TBF.

If the power control parameter is not directly given through the multiple TBF uplink assignment message, a variety of methods can be used in order to find the transmit power.

In an embodiment, if a timeslot is assigned through the multiple TBF uplink assignment message, the mobile station can set a power control parameter of the assigned timeslot to a default value. For example, the default value may be zero. By setting the power control parameter to the default value, when the packet uplink assignment message is received, the mobile station can calculate a transmit power of an assigned timeslot and perform uplink transmission by employing the calculated transmit power.

In another embodiment, the mobile station can calculate a transmit power by employing a previous power control parameter. The previous power control parameter refers to a power control parameter that had been used in a packet transfer mode anterior to a current packet transfer mode. If there exists a previous power control parameter with respect to a corresponding timeslot, the mobile station calculates an output power by employing the previous power control parameter. If there does not exist a previous power control parameter, the mobile station can calculate a transmit power by setting the power control parameter to a default value.

Figure 5:
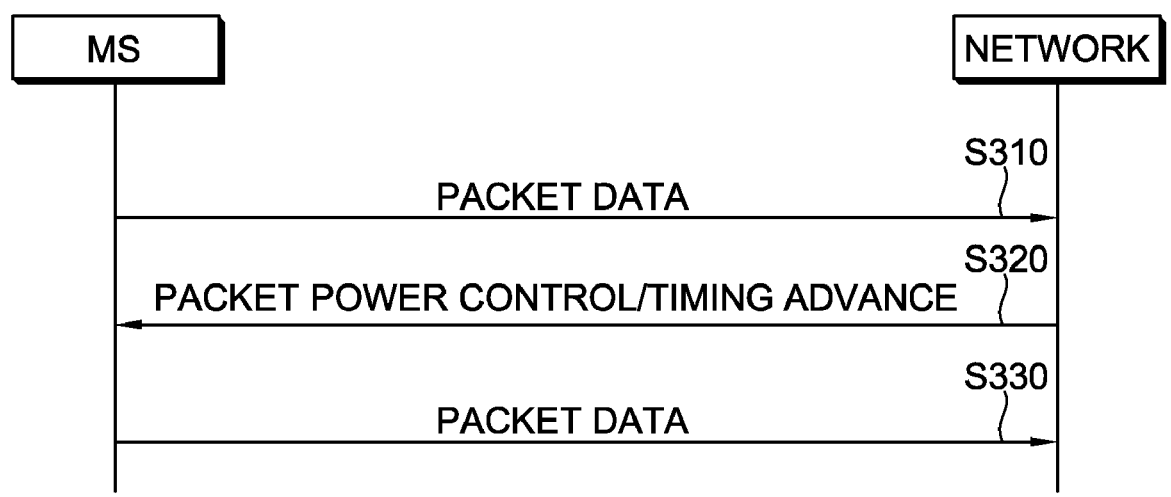
FIG. 5 is a flowchart illustrating a method of controlling a transmit power in accordance with still another embodiment of the present invention.

FIG. 5 is a flowchart illustrating a method of controlling a transmit power in accordance with still another embodiment of the present invention.

Referring to FIG. 5, in a packet transfer mode, a mobile station transmits packet data through an assigned timeslot (S310). During the packet transfer mode, the network can update power and/or TA (Timing Advance) of the mobile station by sending a packet power control/TA message to the mobile station (S320). TA can be a value used to advance a transmit timing to the base station in order to compensate for propagation delay in the mobile station. The packet power control/TA message can be transmitted on the PACCH.

Only TA can be updated through the packet power control/TA message. In other words, this corresponds to a case where the network sends only TA. If TA is updated, the transmit power of each timeslot can be found by employing a previous power control parameter. The previous power control parameter is a power control parameter that had been used by a corresponding timeslot in a current packet transfer mode. That is, since a current mode is a packet transfer mode, a transmit power parameter that had been used previously exists in each timeslot in order to transmit old packet data. The transmit power of the timeslot is found by employing the transmit power parameter that had been used. If a previous transmit power parameter does not exist, the power control parameter can be set to a default value.

Only power can be updated through the packet power control/TA message. This corresponds to a case where the network sends a power control parameter. Here, a transmit power is calculated by employing a received power control parameter.

Power with respect to only a part of timeslots can be updated through the packet power control/TA message. A transmit power with respect to some of the timeslots to which a transmit power parameter is given is calculated by employing the given transmit power parameter. A transmit power with respect to the remaining timeslots to which a transmit power parameter is not given is calculated by employing a previous power control parameter.

Both power and TA can be updated through the packet power control/TA message. Even in this case, a transmit power of a timeslot to which a power control parameter is not given is calculated by employing a previous power control parameter.

The mobile station transmits packet data by employing the obtained transmit power and the updated power and/or TA (S330).

Figure 6:
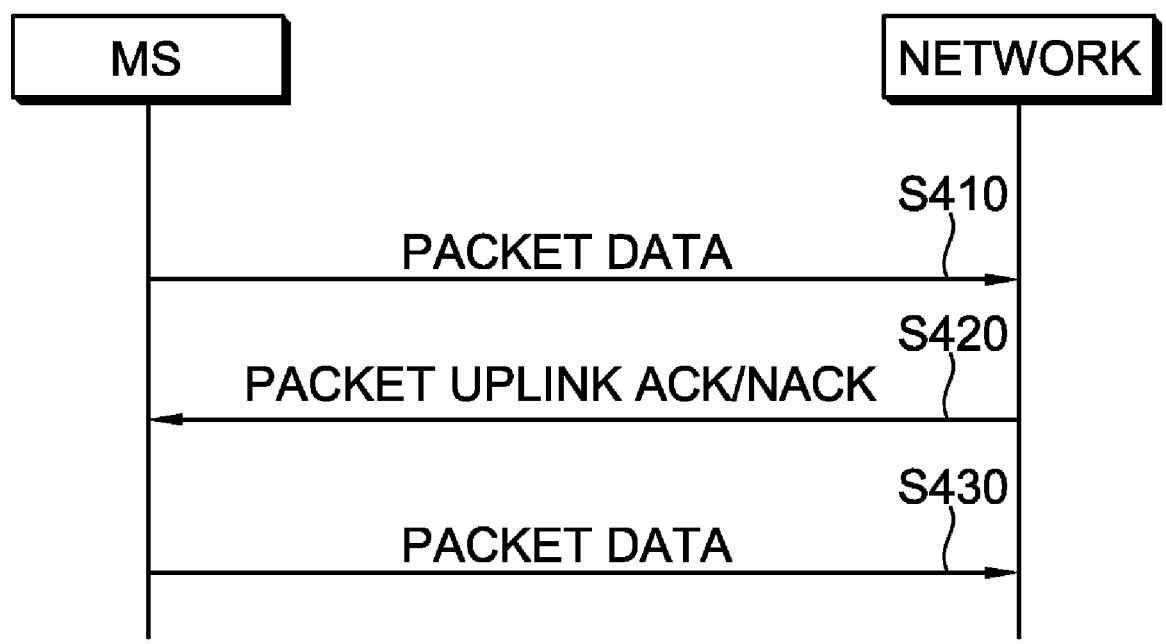
FIG. 6 is a flowchart illustrating a method of controlling a transmit power in accordance with still another embodiment of the present invention.

FIG. 6 is a flowchart illustrating a method of controlling a transmit power in accordance with still another embodiment of the present invention.

Referring to FIG. 6, in a packet transfer mode, a mobile station transmits packet data through an assigned timeslot (S410). During the packet transfer mode, a network can update power and/or TA of the mobile station by sending a packet uplink ACK (Acknowledgment)/NACK (Non-Acknowledgment) message to the mobile station (S420). The packet uplink ACK/NACK message is a message that is sent from the network to the mobile station in order to inform the state of a received RLC (Radio Link Control) data block and can be transmitted on PACCH. The packet uplink ACK/NACK message includes power and/or TA and can update power and/or TA.

Only power can be updated through the packet uplink ACK/NACK message. That is, this corresponds to a case where the network sends a power control parameter. Here, a transmit power is calculated by employing a received power control parameter.

Power with respect to only a part of timeslots can be updated through the packet uplink ACK/NACK message. A transmit power with respect to some of timeslots to which a transmit power parameter is given is calculated by employing the given transmit power parameter. A transmit power with respect to the remaining timeslots to which a transmit power parameter is not given is calculated by employing a previous power control parameter.

Both power and TA can be updated through the packet uplink ACK/NACK message. Even in this case, a transmit power with respect to a timeslot to which a power control parameter is not given is calculated by employing a previous power control parameter.

The mobile station transmits packet data by employing the obtained transmit power and the updated power and/or TA (S430).

Figure 7:
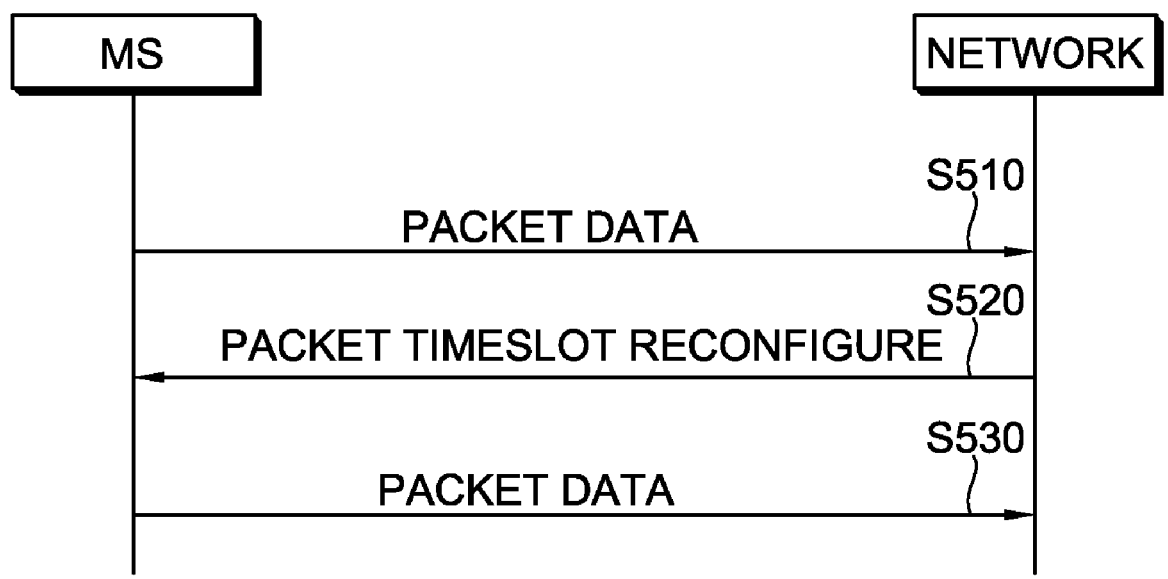
FIG. 7 is a flowchart illustrating a method of controlling a transmit power in accordance with still another embodiment of the present invention.

FIG. 7 is a flowchart illustrating a method of controlling a transmit power in accordance with still another embodiment of the present invention.

Referring to FIG. 7, in a packet transfer mode, a mobile station transmits packet data through an assigned timeslot (S510). During the packet transfer mode, the network can assign an uplink timeslot to the mobile station by sending a packet timeslot reconfigure message to the mobile station (S520). The packet timeslot reconfigure message can be transmitted on PACCH.

The packet timeslot reconfigure message can include a power control parameter with respect to a timeslot in addition to information about at least one timeslot, which is required by the mobile station for uplink transmission. In this case, a transmit power can be found by employing the power control parameter included in the packet uplink assignment message. When the power control parameter is not included in the packet timeslot reconfigure message, a variety of methods can be used in order to define the power control parameter with respect to the timeslot.

In an embodiment, if a timeslot is assigned through the packet timeslot reconfigure message, the mobile station can set a power control parameter, with respect to the assigned timeslot, to a previously set value. For example, the set value may be zero. By setting the power control parameter to the previously set value, the mobile station can calculate a transmit power of the assigned timeslot if the packet timeslot reconfigure message is received and perform uplink transmission based on the calculated transmit power.

In another embodiment, the mobile station can calculate a transmit power of an assigned timeslot by employing a previous power control parameter. The previous power control parameter can include two kinds. The first previous power control parameter is a power control parameter that had been used in a corresponding timeslot in a current packet transfer mode. That is, if an assigned timeslot has once been used in a current packet transfer mode, a transmit power parameter that has been used becomes a first previous power control parameter. The second previous power control parameter is a power control parameter that had been used in a packet transfer mode anterior to a current packet transfer mode. That is, in the case where the mode changes from a packet transfer mode to a packet idle mode and then becomes a current packet transfer mode again, a power control parameter that had been used in a previous packet transfer mode is a second previous power control parameter. The mobile station gives a priority to the first previous power control parameter. If the first previous power control parameter exists, the mobile station can find a transmit power by employing the first previous power control parameter. If the first previous power control parameter does not exist and the second previous power control parameter exists, the mobile station can find a transmit power by employing the second previous power control parameter. If both the first previous power control parameter and the second previous power control parameter do not exist, the mobile station can find a transmit power by employing a default value. As another example, the mobile station can find a transmit power by employing only one of the first previous power control parameter or the second previous power control parameter.

The mobile station transmits packet data by employing the obtained transmit power and the assigned timeslot (S530).

Figure 8:
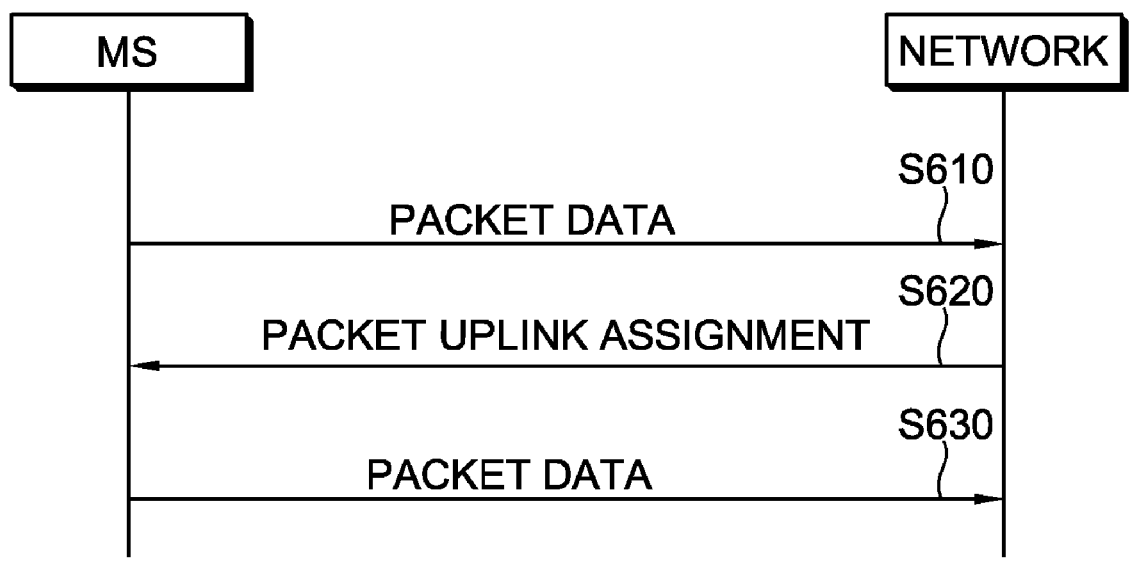
FIG. 8 is a flowchart illustrating a method of controlling a transmit power in accordance with still another embodiment of the present invention.

FIG. 8 is a flowchart illustrating a method of controlling a transmit power in accordance with still another embodiment of the present invention.

Referring to FIG. 8, a mobile station transmits packet data to a network through an assigned timeslot (S610). During the packet transfer mode, the network can assign an uplink timeslot to the mobile station by sending a packet uplink assignment message to the mobile station (S620). In other words, unlike the embodiment of FIG. 3, the packet uplink assignment message can be sent from the network to the mobile station during transmission of packet data not a response to a packet channel request message in order to assign a new timeslot. A default value can be used as a transmit power parameter with respect to an assigned timeslot.

The mobile station transmits packet data by employing the obtained transmit power and the assigned timeslot (S630).

Figure 9:
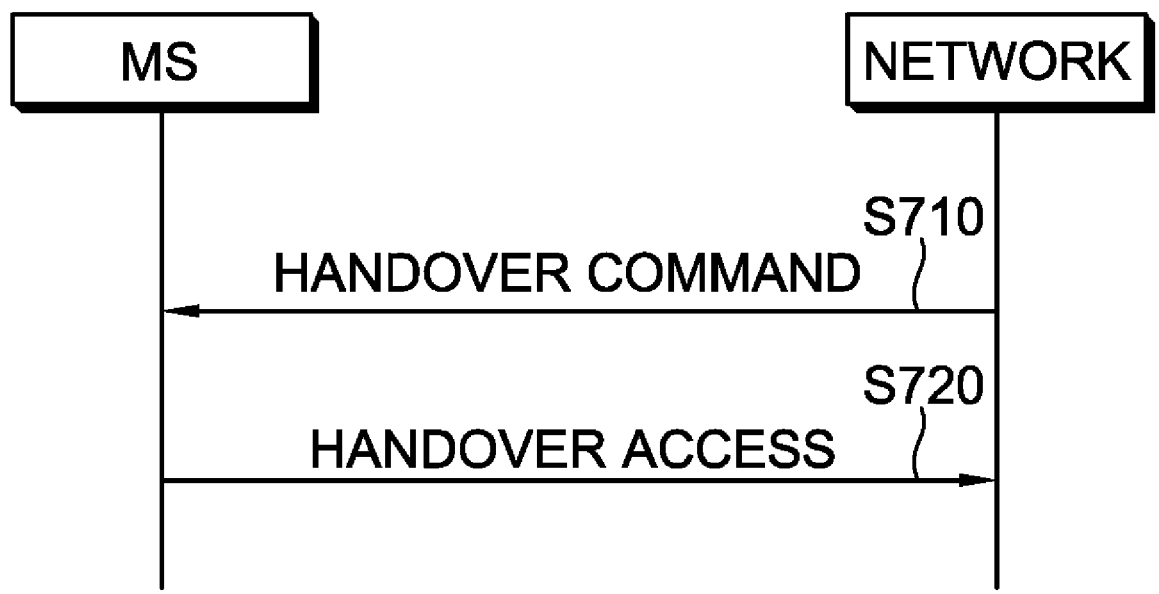
FIG. 9 is a flowchart illustrating a method of controlling a transmit power in accordance with still another embodiment of the present invention.

FIG. 9 is a flowchart illustrating a method of controlling a transmit power in accordance with still another embodiment of the present invention. This shows a method of controlling a transmit power during handover.

Referring to FIG. 9, the network transmits a handover command message to the mobile station on the PACCH (S710). The handover command message is a message to instruct that the mobile station should leave a current cell and arrive in a new cell. The handover command message includes information about radio resources, allocated for a packet-switched service in a new cell, and also includes at least one timeslot assignment information.

If a power control parameter with respect to an assigned timeslot is not given, the mobile station that has received the handover command message determines a power control parameter as a set value. The mobile station finds a transmit power by employing the set power control parameter.

The mobile station transmits a handover access message to the network (S720). The handover access message is to make the network aware that the mobile station has left the old cell and arrived in the new cell. The handover access message is sent on the PACCH associated with an uplink TBF allocated in the handover command message.

If a cell is changed, a power control parameter has to be changed. The power control parameter is sensitive to path loss. Path loss is greatly influenced by a distance between a mobile station and a network. Thus, if only a timeslot is assigned through a handover command message during handover, but the power control parameter for the timeslot is not given, a transmit power can be controlled stably by setting the power control parameter to a set value.

When a mobile station is assigned a timeslot or updates power and/or timing advance for uplink transmission, the mobile station can stably control a transmit power of a timeslot.

The functions described in connection with the embodiments disclosed herein may be performed by implemented by hardware, software or a combination thereof. The hardware may be implemented by a microprocessor, a controller, an application specific integrated circuit (ASIC) and a processor. Design, development and implementation of the software are well known to those skilled in the art based on the detailed description.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A method of controlling a transmit power at a mobile station in a wireless communication system, the method comprising:
    determining a power control parameter of an assigned timeslot, wherein the value of the power control parameter is a default value if the assigned timeslot is assigned with no power control parameter and the value of the power control parameter is the current value if the assigned timeslot is already used by the mobile station; and
    determining the transmit power $P_{up}$ on an uplink channel from the following equation:

$$P_{UP}=\min\{C_0-C_{CH}-r(L+48), P_{MAX}\}$$

where $C_0$ is a power offset, $C_{CH}$ is the power control parameter, r is a system parameter, L is a normalized received signal level at the mobile station and $P_{MAX}$ is the maximum allowed transmit power in a cell.

2. The method of claim 1, further comprising:
    transmitting data on the uplink channel using the transmit power.

3. The method of claim 1, wherein the uplink channel is a packet data channel (PDCH).

4. The method of claim 1, wherein the system parameter is broadcasted on a packet broadcast control channel (PBCCH).

5. The method of claim 1, further comprising:
    receiving a downlink control message for allocating at least one timeslot, the control message allocating the assigned timeslot without any power control parameter for the assigned timeslot.

6. The method of claim 5, wherein the downlink control message is a packet uplink assignment message to assign uplink resources.

7. The method of claim 5, wherein the downlink control message is a multiple temporary block flow (TBF) uplink assignment message to assign uplink resources.

8. The method of claim 5, wherein the downlink control message is a packet timeslot reconfigure message to assign uplink resources.

9. The method of claim 5, wherein the downlink control message is a handover command message from a network to command the mobile station to leave a current cell and change to a new cell.

10. The method of claim 1, further comprising:
    receiving a downlink control message for updating a timing advance.

11. The method of claim 1, further comprising:
    receiving a downlink control message for updating a timing advance and indicating the status of a received radio link control (RLC) data blocks.

12. The method of claim 1, wherein the default value is zero.

13. A method of controlling a transmit power at a mobile station during handover in a wireless communication system, the method comprising:
    receiving a handover command message from a network to command the mobile station to leave a current cell and change to a new cell, the handover command message comprising radio resources assigned for packet-switched (PS) services in the new cell, the radio resources comprising information on at least one assigned timeslot;
    determining a power control parameter of an assigned timeslot as a default value if the assigned timeslot is assigned with no power control parameter; and
    determining the transmit power $P_{up}$ on an uplink channel from the following equation:

$$P_{UP}=\min\{C_0-C_{CH}-r(L+48), P_{MAX}\}$$

where $C_0$ is a power offset, $C_{CH}$ is the power control parameter, r is a system parameter, L is a normalized received signal level at the mobile station and $P_{MAX}$ is the maximum allowed transmit power in a cell.

14. The method of claim 13, further comprising:
    transmitting a handover access message to the network to make the network aware that the mobile station has left the old cell and arrived in the new cell.

15. The method of claim 13, wherein the default value is zero.

16. The method of claim 13, wherein the handover command message is received on a packet associated control channel (PACCH).

17. A mobile station comprising:
- a RF (Radio Frequency) unit for transmitting radio signals using a transmit power;
- a memory configured to store a default value for a power control parameter; and
- a processor coupled to the RF unit and the memory, and configured to determine a power control parameter of an assigned timeslot, wherein the value of the power control parameter is the default value if the assigned timeslot is assigned with no power control parameter and the value of the power control parameter is the current value if the assigned timeslot is already used by the mobile station; and determine the transmit power $P_{up}$ from the following equation:

$$P_{UP} = \min\{C_0 - C_{CH} - r(L+48), P_{MAX}\}$$

where $C_0$ is a power offset, $C_{CH}$ is the power control parameter, $r$ is a system parameter, $L$ is a normalized received signal level at the mobile station and $P_{MAX}$ is the maximum allowed transmit power in a cell.

18. The mobile station of claim 17, wherein the transmit power is determined during handover.

19. The mobile station of claim 17, wherein the assigned timeslot is a part of a time division multiple access (TDMA) frame composed of eight timeslots.

* * * * *